US012597331B2

(12) United States Patent
Lee

(10) Patent No.: US 12,597,331 B2
(45) Date of Patent: Apr. 7, 2026

(54) ELECTRICAL SAFETY ALARM APPARATUS

(71) Applicant: Kyu Bok Lee, Seoul (KR)

(72) Inventor: Kyu Bok Lee, Seoul (KR)

( * ) Notice: Subject to any disclaimer, the term of this patent is extended or adjusted under 35 U.S.C. 154(b) by 357 days.

(21) Appl. No.: 18/263,770

(22) PCT Filed: Mar. 11, 2022

(86) PCT No.: PCT/KR2022/003432
§ 371 (c)(1),
(2) Date: Jan. 31, 2024

(87) PCT Pub. No.: WO2022/231122
PCT Pub. Date: Nov. 3, 2022

(65) Prior Publication Data

US 2024/0153372 A1 May 9, 2024

(30) Foreign Application Priority Data

Apr. 29, 2021 (KR) ........................ 10-2021-0055518

(51) Int. Cl.
*G08B 21/18* (2006.01)
*G08B 25/10* (2006.01)

(52) U.S. Cl.
CPC ........... *G08B 21/185* (2013.01); *G08B 25/10* (2013.01)

(58) Field of Classification Search
CPC .......... G01K 1/02; G01R 31/086; G08B 7/06; G08B 13/191; G08B 17/02; G08B 17/06; G08B 17/125; G08B 21/02; G08B 21/18; G08B 21/185; G08B 25/10; G08C 17/02; H02B 1/24; H02B 1/30; H02B 7/06; H02B 13/025; H04Q 9/00; Y02B 90/20; Y02E 60/00
(Continued)

(56) References Cited

U.S. PATENT DOCUMENTS

| | | | | |
|---|---|---|---|---|
| 2005/0128096 A1* | 6/2005 | Adams | .................. | G08B 21/24 340/568.1 |
| 2015/0339913 A1* | 11/2015 | Lyman | ............... | G07C 9/00182 340/287 |
| 2020/0147427 A1* | 5/2020 | Atkinson | ............... | A62C 37/08 |

FOREIGN PATENT DOCUMENTS

| | | |
|---|---|---|
| JP | 05-233979 A | 9/1993 |
| KR | 10-2009-0064665 A | 6/2009 |

(Continued)

*Primary Examiner* — Stephen R Burgdorf
(74) *Attorney, Agent, or Firm* — You & IP, LLC

(57) ABSTRACT

Switchgear equipment (a cubicle) that houses various transformers are installed in a substation room that converts 22.9 KV extra-high voltage to low voltage 380/220V. As electrical safety personnel have to inspect the switchgear equipment on daily, monthly, quarterly, and annual basis, electric shock accidents frequently occur due to exposure to high voltage and high current. To remind workers to work safe, the present invention provides an electrical safety alarm apparatus that, before opening a door, not only displays various safety phrases but also reminds the electrical safety personnel of a voice event to thus prevent electrical disasters in advance, and that is installed (attached) to the front/rear side of a switchgear panel to strongly remind operators to pay attention to safety during inspection and maintenance of extra-high and low voltage boards, power MCC boards, distribution boards, plant control boards, and the like to thus prevent electrical disasters in advance.

2 Claims, 9 Drawing Sheets

(58) Field of Classification Search
USPC .......................................................... 340/657
See application file for complete search history.

(56) References Cited

FOREIGN PATENT DOCUMENTS

| | | | |
|---|---|---|---|
| KR | 10-1076772 | B1 | 10/2011 |
| KR | 10-2012-0058953 | A | 6/2012 |
| KR | 10-1237881 | B1 | 2/2013 |
| KR | 10-1314089 | B1 | 10/2013 |
| KR | 20-0485163 | Y1 | 12/2017 |
| KR | 10-2020-0006916 | A | 1/2020 |
| KR | 10-2347172 | B1 | 1/2022 |

* cited by examiner

ELECTRICAL SAFETY ALARM APPARATUS

TECHNICAL FIELD

The present invention relates to an electrical safety alarm apparatus and, more particularly, to an electrical safety alarm apparatus installed (attached) to the front/rear side of a switchgear panel, capable of strongly reminding operators to pay attention to safety during inspection and maintenance of extra-high and low voltage boards, power MCC boards, distribution boards, plant control boards, and the like, preventing electric shock accidents in advance, and providing a working environment optimized for safety during electrical work or maintenance inspection.

BACKGROUND ART

A customer's switchgear, which is equipment for receiving 22.9 kV extra-high voltage electricity from the Korea Electric Power Corporation (KEPCO) and supplying safe and high-quality low-voltage electricity, comprises Automatic breakdown switch (AISS), instrument transformer (MOF), power fuse (PF), vacuum circuit breaker (VCB), transformer, air circuit breaker (ACB), branch circuit breaker (MCCB), other protective relays (OCR, OCGR, UVR, OVR), emergency generator linkage and automatic transfer system (ATS), rectification base, and so forth and is installed in a protective fence or inside a building to control outsiders access.

A switchgear or an electric power distribution system, which is an installation for converting extra-high voltage to low voltage, involves the risk of occupational hazards to operators. According to the 2010 electrical disaster statistical analysis of the Korea Electrical Safety Corporation, out of a total of 579 cases of electric shock, 203 electrical engineers were killed or injured, and by type, direct contact with live parts was the most common at 48.7%, and electric shock accidents caused by arcs was at 83%.

The main purpose of the conventional access alarm system is to detect the access of a person or animal, using infrared rays or a human body sensor, and the conventional access alarm system is not sufficient as a safety apparatus for operators. That is, when an operator makes access for periodic inspection of high-voltage equipment, the access alarm system must be turned off, and a worker must inspect the high-voltage equipment in an uninterrupted state, i.e., in a live wire state, in order to supply good quality electricity without blackout. Accordingly, if an inspection time gets longer or a gap occurs while the access alarm system is off, no warning or alarm will be sounded, resulting in an electric shock accident by not securing a safe distance during work.

To solve such problems, Patent Document 1 suggested an electric shock hazard warning device for a switchgear using a complex sensor that issues a warning if a person approaches the switchgear within a set distance, wherein the switchgear is installed in a dangerous area or an area requiring protection, and keeps records of managers (inspectors, operators, and so on) so that they can be used as data to identify the cause of an accident later in the case of the accident. However, since the electric shock hazard warning device cannot set an exact detection distance, the power of a detection device must be turned off. In addition, operation and failure of the detection device cannot be visually recognized, rendering maintenance difficult. Also, in the case of a failure, a long gap until recovery may cause an accidental electric shock.

The prior art suggested in Patent Document 2 relates to a method, wherein, when a human body or an object come into contact with the charging part of a switchgear, an infrared light emitting network formed by the interaction of a plurality of transmitting and receiving infrared sensors senses the contact, issues an alarm differentially according to entry distances, and shuts off the internal power of the switchgear when the human body or the object approaches within the risk of electric shock. However, the prior art merely generates an alarm by detecting the approach of the human body or object entering the inside of the switchgear and does not comprise an alarm or a safety device in case of electric shock that may occur during inspection to thus entail a risk of electric shock during the inspection.

PRIOR ART REFERENCE/DOCUMENTS

Patent Documents (Patent Document 1) Patent Document 1: Korean Patent registration No. 10-1076772

(Patent Document 2) Patent Document 2: Korean Patent registration No. 10-1237881

(Patent Document 3) Patent Document 3: Korean Patent registration No. 10-2009-0064665

(Patent Document 4) Patent Document 4: Korean Patent registration No. 10-2020-0006916

CONTENT OF THE INVENTION

Objects to be Solved

The present invention is to solve the various disadvantages and problems of the prior art as described above. Switchgear equipment (a cubicle) that houses various transformers are installed in a substation room that converts 22.9 KV extra-high voltage to low voltage 380/220V. As electrical safety personnel have to inspect the switchgear equipment on daily, monthly, quarterly, and annual basis, electric shock accidents frequently occur due to exposure to high voltage and high current. An object of the present invention is to provide an electrical safety alarm apparatus capable of providing a working environment optimized for safety during electrical work or maintenance inspection by strongly reminding workers to pay attention to safety, wherein, to remind workers to work safe, the present invention not only displays various safety phrases before opening a door, but also reminds the electrical safety personnel of a voice event, thereby preventing electrical disasters in advance, and wherein the present invention is installed (attached) on the front/rear side of a switchgear panel to strongly remind an operator to pay attention to safety during the inspection and maintenance of extra-high and low voltage boards, power MCC boards, distribution boards, plant control boards, and the like.

Solution to Objects

To this end, the present invention provides an electrical safety alarm apparatus comprising: a speaker unit 110 configured to output a voice to remind electrical safety personnel of voice events on various safety phrases before opening the door of a switchgear, an extra-high voltage board, a low voltage board, a power MCC board, a distribution board, or a plant control board panel; a display unit 120 configured to display the voice events on the various safety phrases in text to remind the electrical safety personnel before opening the door of the switchgear, extra-high voltage board, low voltage board, power MCC board, distribution board, or plant control board panel; a first display unit 130 and a second display unit 131 configured to respectively display an electricity transmission state or a power failure state of the electrical safety alarm apparatus 100; a DI INPUT port 140 and a DO OUTPUT port 141, an AC 220 input port 150, and a DC 125 input port 151 constituting a DI 4CH (NO) port, a DO 4CH (no voltage) port, a use power port, and a high-voltage transmission detection port of the electrical safety alarm apparatus 100; a first communication unit 160 comprising a LAN port and configured to transmit the state of the electrical safety alarm apparatus 100 to an electrical safety server 200 via a communication network; a door detection switch 190 configured to detect the opening/closing of a door of a cubicle comprising the switchgear, extra-high voltage board, low voltage board, power MCC board, distribution board, and plant control board; an electrical detection relay 191, which is a relay that detects electricity transmission/failure of the cubicle comprising the switchgear, extra-high voltage board and low voltage board, power MCC board, distribution board, and plant control board; and a controller 180 configured to control the speaker unit 110, the display unit 120, the first and second display units 130 and 131, the DI INPUT port 140, the DO OUTPUT port 141, the AC 220 input port 150, the DC 125 input port 151, and the first communication unit 160, wherein:

- the control unit 180 comprises a memory in which various texts or voices is stored and information for Bluetooth connection with the smart phone of the operator or electrical safety personnel is stored;
- the electrical safety alarm apparatus accesses, through the first communication unit 160, the AP (Access point) and transmits, to the electrical safety server 200 through a communication network such as Wi-Fi, an event log including door opening/closing to be recorded and stored; and
- the controller 180 also controls the speaker unit 110 to output voice according to results detected by the door detection switch 190 and the electrical detection relay 191, and performs control to display the various texts through the display unit 120, and to display the state of the electrical safety alarm apparatus 100 through the first and second display units 130 and 131, and to transmit state information of the electrical safety alarm apparatus 100 to the electrical safety server 200 through the first communication unit 160.

Effects of the Invention

According to an embodiment of the present invention, there are the following effects:

First, switchgear equipment (a cubicle) that houses various transformers are installed in a substation room that converts 22.9 KV extra-high voltage to low voltage 380/220V. As electrical safety personnel have to inspect the switchgear equipment on daily, monthly, quarterly, and annual basis, electric shock accidents frequently occur due to exposure to high voltage and high current. To remind a worker to work safe, the present invention not only displays various safety phrases before opening a door, but also reminds the electrical safety personnel of a voice event, thereby preventing electrical disasters in advance.

Second, since the present invention is installed (attached) on the front/rear side of a switchgear panel, it can strongly remind an operator to pay attention to safety during the inspection and maintenance of extra-high and low voltage boards, a power MCC board, a distribution board, a plant control board, and the like, prevent electric shock accidents in advance, and provide a working environment optimized for safety during electrical work or maintenance inspection.

Third, by adding a Bluetooth or Wi-Fi function to the switchgear panel and registering the smart phone or smart device of the worker or operator, the present invention can send various safety phrases or events related to safety to the smart phone or smart device of the worker or operator, further improving the worker or operator's safety.

Exemplary Forms for Implementing the Invention

A preferred embodiment of the present invention will be described in detail with reference to the accompanying drawings.

The terms used in the present invention have been selected from general terms that are currently widely used as much as possible. In certain cases, there are terms arbitrarily selected by the applicant; however, since the meaning has been described in detail in the description of the corresponding invention, it is intended to clarify that the present invention should be understood as the meaning of the term rather than the simple name of the term. In addition, in describing the embodiments, descriptions about techniques that are well known in the technical field to which the present invention pertains and that are not directly related to the present invention will be omitted. This is to more clearly convey the gist of the present invention without obscuring it by omitting unnecessary descriptions.

Figure 1:
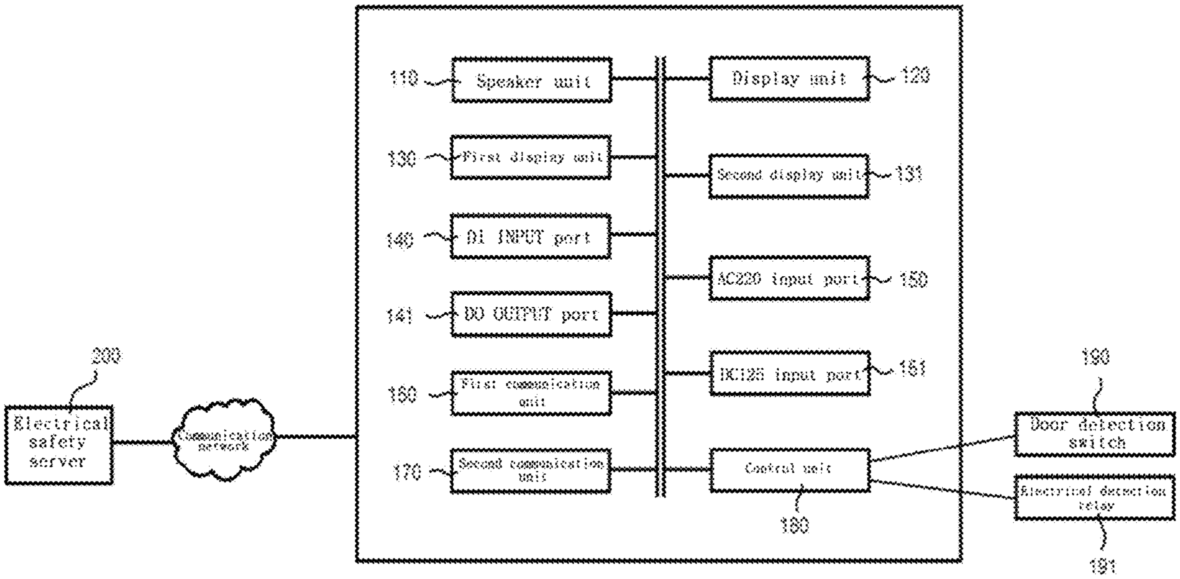
FIG. 1 is a block diagram illustrating the electrical safety alarm apparatus according to the present invention.
Figure 2:
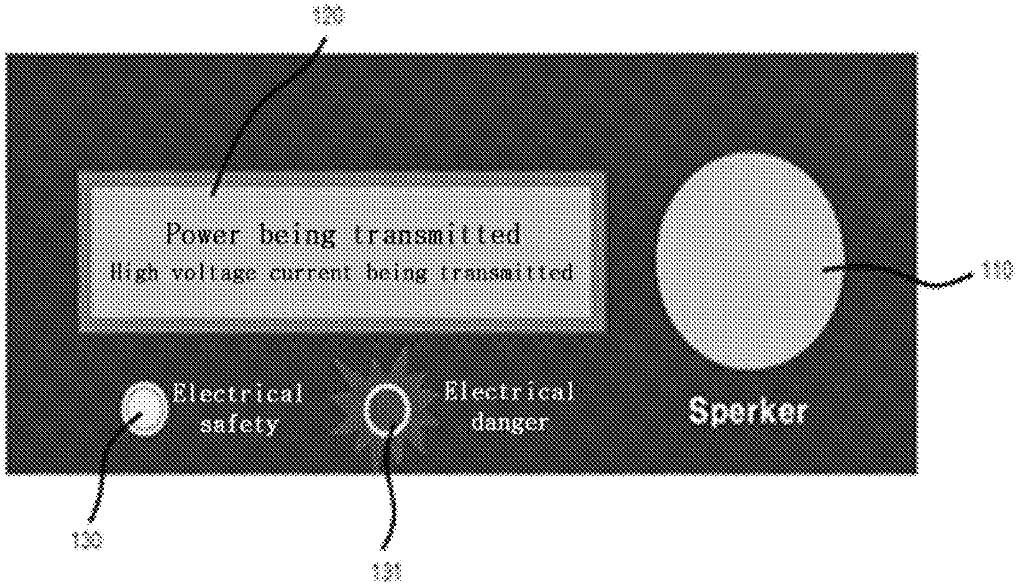
FIG. 2 illustrates the front of a panel in which the electrical safety alarm apparatus according to the present invention is used.
Figure 3:
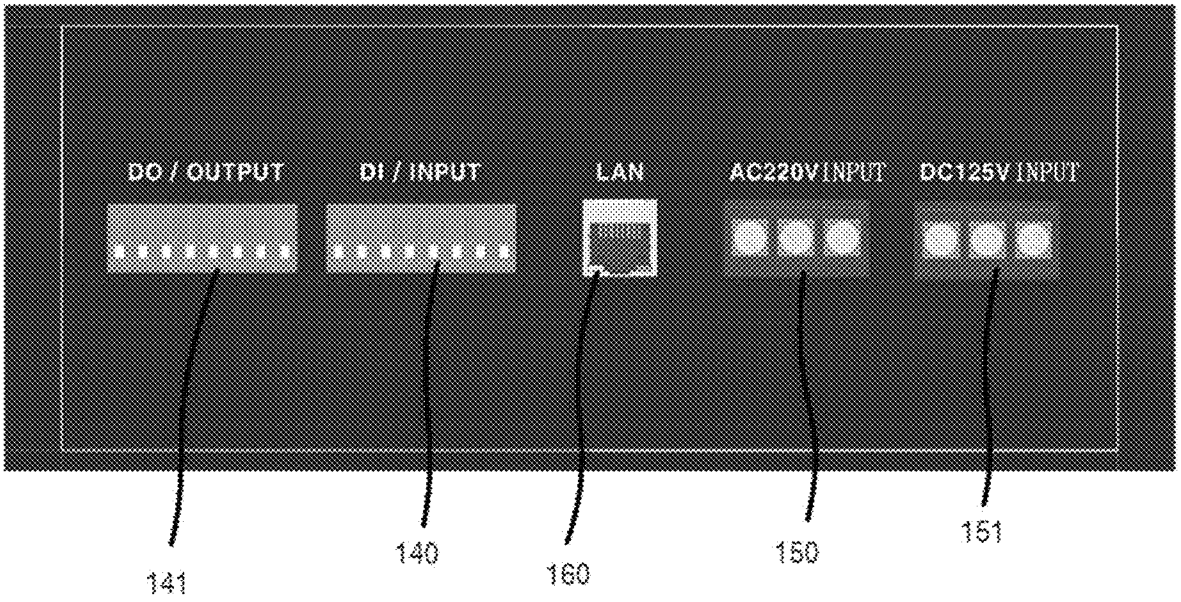
FIG. 3 illustrates the rear side of a panel in which the electrical safety alarm apparatus according to the present invention is used.

FIG. 1 is a block diagram illustrating the electrical safety alarm apparatus according to the present invention. FIG. 2 illustrates the front of a panel in which the electrical safety alarm apparatus according to the present invention is used. FIG. 3 illustrates the rear side of a panel in which the electrical safety alarm apparatus according to the present invention is used.

As illustrated in FIG. 1, the electrical safety alarm apparatus according to the present invention comprises a speaker unit 110, a display unit 120, a first and a second display unit 130 and 131, a DI INPUT port 140, and a DO OUTPUT port. (141), an AC 220 input port 150, a DC 125 input port 151, a first communication unit 160, a second communication unit 170, a control unit 180, a door detection switch 190 and an electrical detection relay 191.

The electrical safety alarm apparatus according to the present invention is, for example, to prevent electrical accidents due to exposure to high voltage and high current when electrical safety personnel inspect switchgear equipment on daily, monthly, quarterly, and annual basis, wherein the switchgear equipment (a cubicle) that houses various transformers are installed in a substation room that converts 22.9 KV extra-high voltage to low voltage 380/220V, and is also to prevent electrical disasters in advance not only by displaying various safety phrases before opening a door, but also by reminding the electrical safety personnel of a voice event. The present invention relates to an electrical safety alarm apparatus that is installed (attached) to the front/rear side of a switchgear panel, capable of strongly reminding an operator to pay attention to safety during inspection and maintenance of extra-high and low voltage boards, a power MCC board, a distribution board, a plant control board, and the like, preventing electric shock accidents in advance, and providing a working environment optimized for safety during electrical work or maintenance inspection.

The speaker unit 110 of the electrical safety alarm apparatus 100 of the present invention outputs voice events on various safety phrases as a voice to remind the electrical safety personnel of the various safety phrases, before opening the door of a switchgear, an extra-high voltage board, a low voltage board, a power MCC board, a distribution board, or a plant control board. For example, a voice output during power transmission continuously says, “Power is being transmitted. Please pay attention to your work,” and an electrical safety voice output continuously says, “Power failure is in progress. Please pay attention to your work.”

The display unit 120 displays text to remind electrical safety personnel of voice events on various safety phrases before opening the door of the switchgear, extra-high and low voltage boards, power MCC board, distribution board, or plant control board panel. For example, regarding the current status of the switchgear, “Power being transmitted” and “Electrical safety” are displayed in text. In addition, notification messages are displayed at the bottom of the current status of the switchgear, such as “High voltage current being transmitted!” during the power transmission and “High voltage power failure!” during power failure.

The first and second display units 130 and 131 respectively display the electricity transmission state or power failure state of the electrical safety alarm apparatus 100. The first and second display units 130 and 131 may comprise LEDs. For example, an LED status during power transmission may be displayed by a blinking red LED and an LED status during power failure may be displayed by a steady green LED.

DI INPUT port 140, DO OUTPUT port 141, AC 220 input port 150, and DC 125 input port 151 of the electrical safety alarm apparatus 100 belong to AC220V input (for detecting high voltage transmission) and comprise DI4CH (NO) and DO 4CH (no voltage), wherein DC 125V is used for power, so each power line or terminal is connected.

The first communication unit 160 comprises, for example, a LAN port and transmits the state of the electrical safety alarm apparatus 100 to the electrical safety server 200 through a communication network (Internet network, and the like). The first communication unit 160 allows for remote monitoring (1:N) and recording and storing event logs (second, minute, hour, day, month, year) including door opening/closing. Alternatively, by connecting to a nearby access point (AP)) through the first communication unit 160, event logs including door opening/closing (second, minute, hour, day, month, year) are transmitted, to the electrical safety server 200 through a communication network such as Wi-Fi, to be recorded and saved. That is, wired and wireless networks can be selectively used.

The second communication unit 170 comprises, for example, Bluetooth so that the current state of the switchgear can be transmitted when the second communication unit 170 is connected to a smart phone of an operator or electrical safety personnel.

The door detection switch 190 is, for example, a switch that detects opening/closing the door of the switchgear.

The electrical detection relay 191 is, for example, a relay that detects electricity transmission/failure of the switchgear.

The controller 180 controls a speaker unit 110, a display unit 120, first and second display units 130 and 131, a DIINPUT port 140, a DO OUTPUT port 141, an AC 220 input port 150, the DC 125 input port 151, the first communication unit 160, and the second communication unit 170, and performs control to output a voice through the speaker unit 110 according to results detected by the door detection switch 190 and the electrical detection relay 191, to display various texts through the display unit 120, to display the state of the electrical safety alarm apparatus 100 through the first and second display units 130 and 131, to transmit the state information of the electrical safety alarm apparatus 100 to the electrical safety server 200 through the first communication unit 160, to transmit the status information of the electrical safety alarm apparatus 100 to smart phones of an operator and electrical safety personnel when comprised of Bluetooth through the second communication unit 170, and to transmit the state information of the electrical safety alarm apparatus 100 to the electrical safety server 200 through a nearby access point (AP) and a communication network when comprised of Wi-Fi. Meanwhile, to this end, the control unit 180 further comprises a memory where the various texts or voices are stored and where information for Bluetooth connection with the smart phone of the operator or electrical safety personnel is stored.

As illustrated in FIG. 2, an embodiment shows the electrical safety warning apparatus 100, wherein, on the front of the panel, the speaker unit 110, the display unit 120, and the first and second display units 130 and 131 are exposed to the outside, and as illustrated in FIG. 3, an embodiment shows that the electrical safety warning apparatus 100 comprises, on the back of the panel, the DI INPUT port 140, the DOOUTPUT port 141, the AC 220 input port 150, the DC 125 input port 151 and the first communication unit (LAN port) 160, wherein the second communication unit 170 and the control unit 180 are configured (protected) inside between the front and rear surfaces of the panel.

The product features of the electrical safety alarm apparatus 100 of the present invention are as follows:

1) It is installed in a switchgear, a low voltage board, a power board, and a distribution board with high and low voltage contacts.

2) In normal condition after installation, “Power being transmitted” and “Electrical safety” are displayed in text.
3) When the door is opened, “Power is being transmitted” and “Please pay attention to work” are output continuously.
4) The operating power source uses a switchgear rectifier DC125V.
5) AC220V for detecting high voltage transmission. is used
6) Door open and door close events are recorded and stored.
7) Remote monitoring is possible.
8) AC, DC input power must always be connected (does not work when DC power is off).

In addition, the product standards may be configured as follows:

Power supply: DC125V
I/O: AC220V input (for detecting high voltage transmission)
DI 4CH(NO), DO 4CH (no voltage)
MCU (Control Unit): Cortex M3
Display: LCD (Korean language support)
Network LAN
Speaker: 8 ohm, 3 W Operating temperature: −10° C.-60° C.

The product standards are described above.

Figure 4:
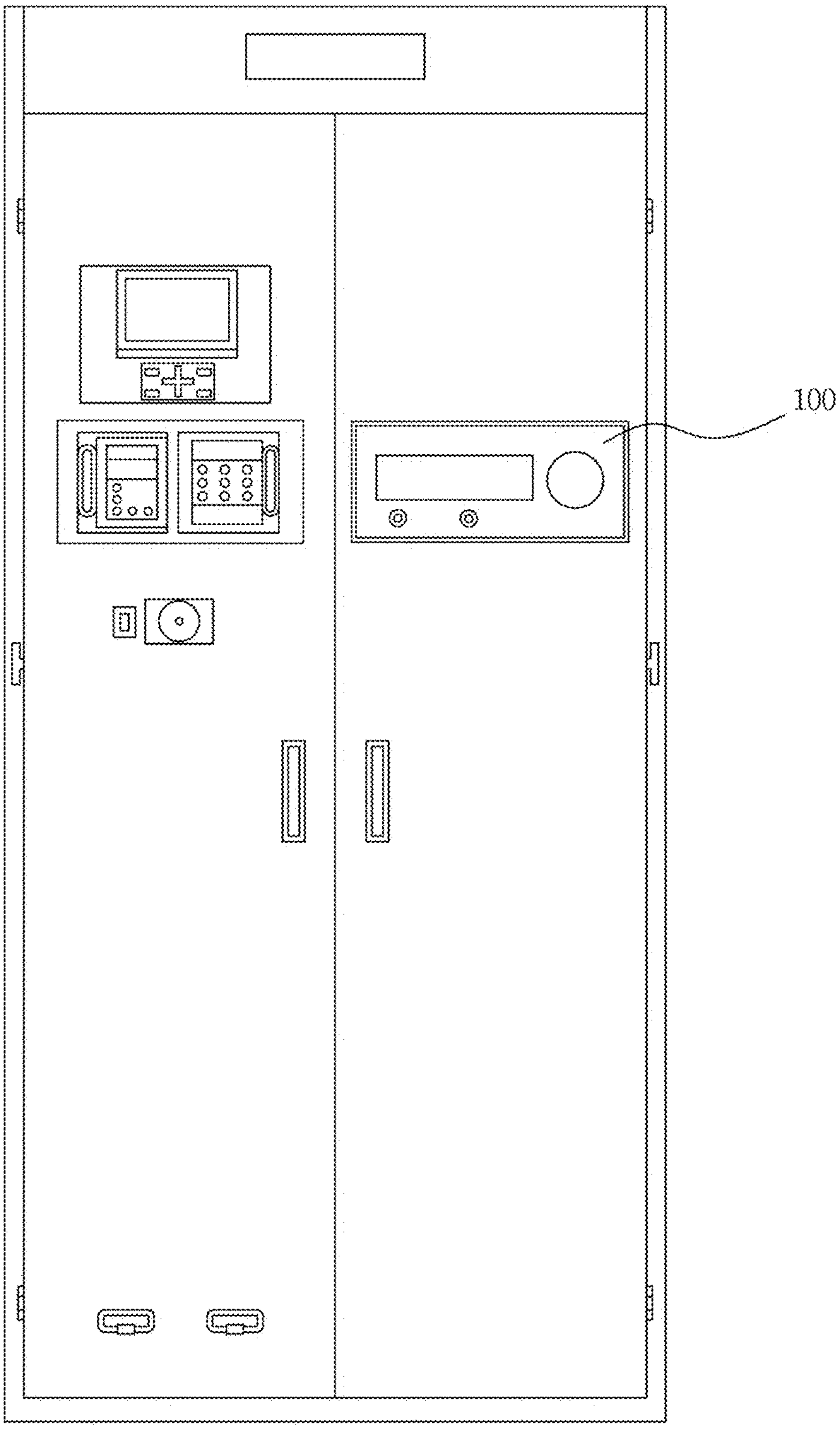
FIG. 4 is an exemplary installation view of a switchgear to which a panel, in which the electrical safety alarm apparatus according to the present invention is used, is applied.
Figure 5:
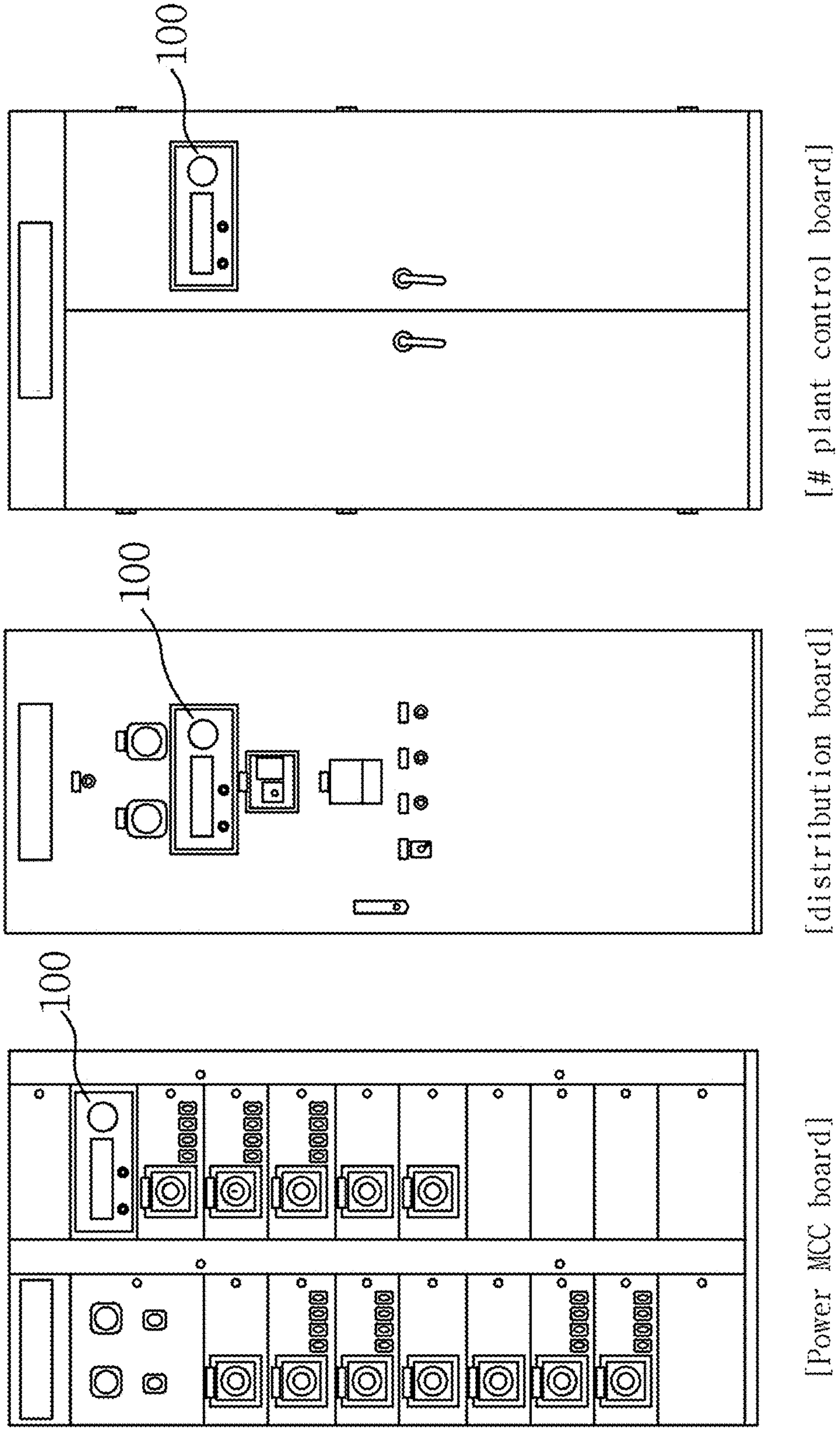
FIG. 5 is an exemplary view in which a panel, in which the electrical safety alarm apparatus according to the present invention is used, is applied to a power MCC board, a distribution board, and a #plant control board.

FIG. 4 is an exemplary installation view of a switchgear to which a panel, in which the electrical safety alarm apparatus according to the present invention is used, is applied, and FIG. 5 is an exemplary view in which a panel, in which the electrical safety alarm apparatus according to the present invention is used, is applied to a power MCC board, a distribution board, and a #plant control board.

FIGS. 4 and 5 illustrate examples the panel, to which the electrical safety alarm apparatus in FIGS. 1 to 3 is applied, is applied to a switchgear, a power MCC board, a distribution board, and a plant control board.

Figure 6:
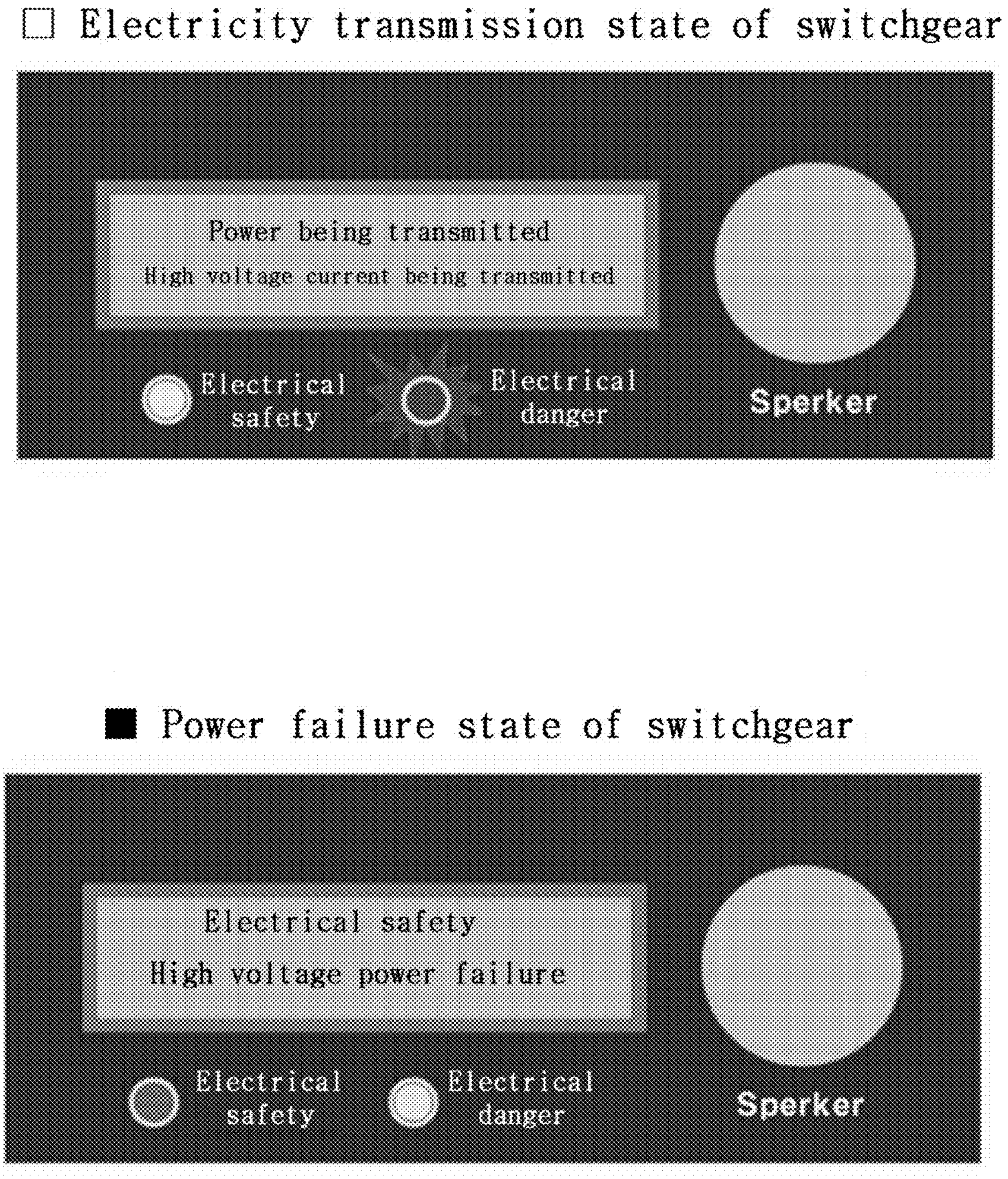
FIG. 6 is an embodiment where the panel, to which the electrical safety alarm apparatus according to the present invention is applied, shows a power transmission state and a power failure state of the switchgear.

FIG. 6 is an embodiment where a panel, to which the electrical safety alarm apparatus according to the present invention is applied, shows a power transmission state and a power failure state of the switchgear.

FIG. 6, which illustrates that the panel, to which the electrical safety alarm apparatus according to the present invention is applied shows a power transmission state and a power failure state of the switchgear, exemplifies display text on the display unit 120 and operating states of the first and second display units when the switchgear is in the power transmission state or power failure state thereof.

Figure 7:
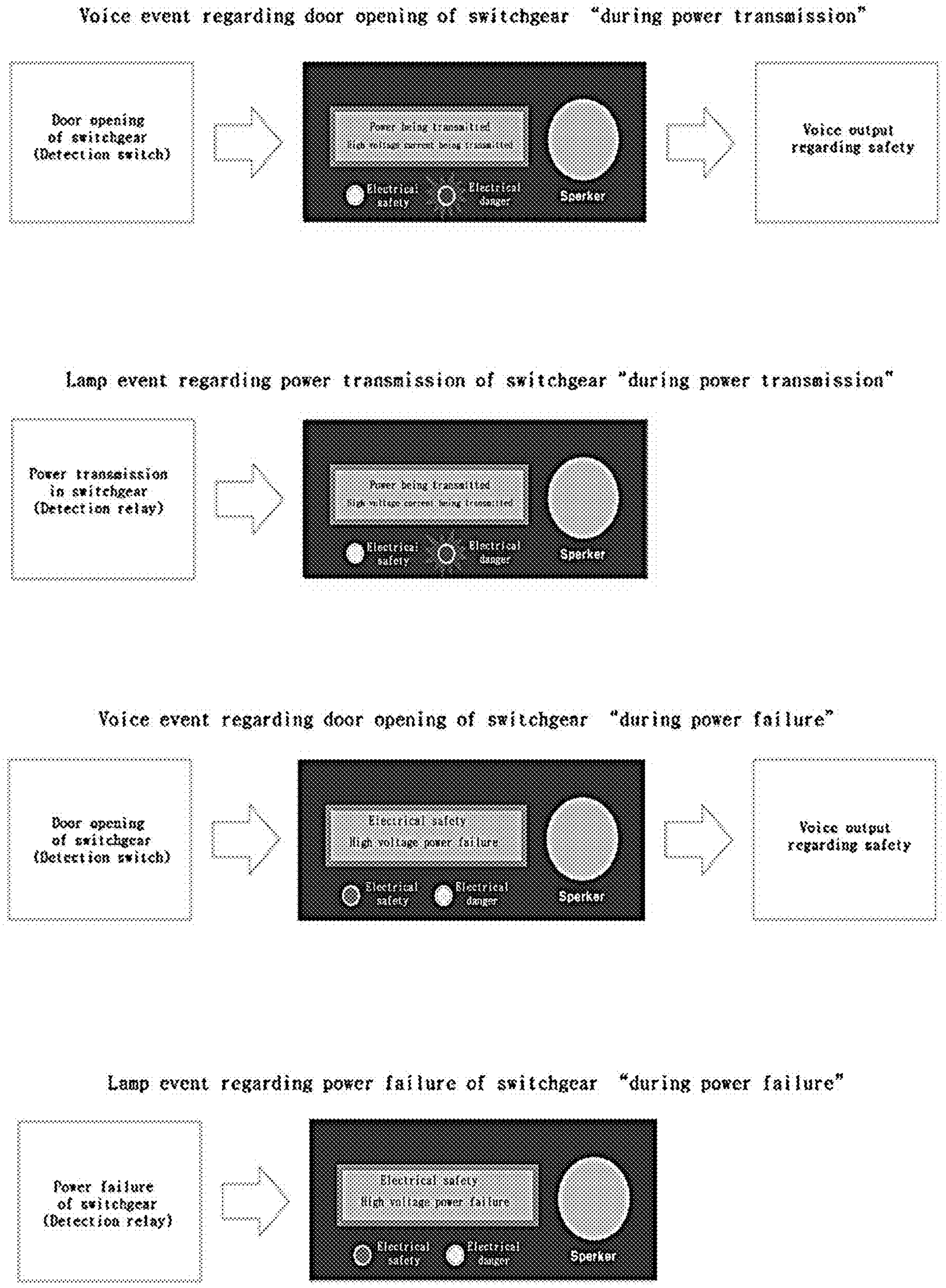
FIG. 7 illustrates an embodiment in which a switch and a relay are applied to the electrical safety alarm apparatus according to the present invention.
Figure 8:
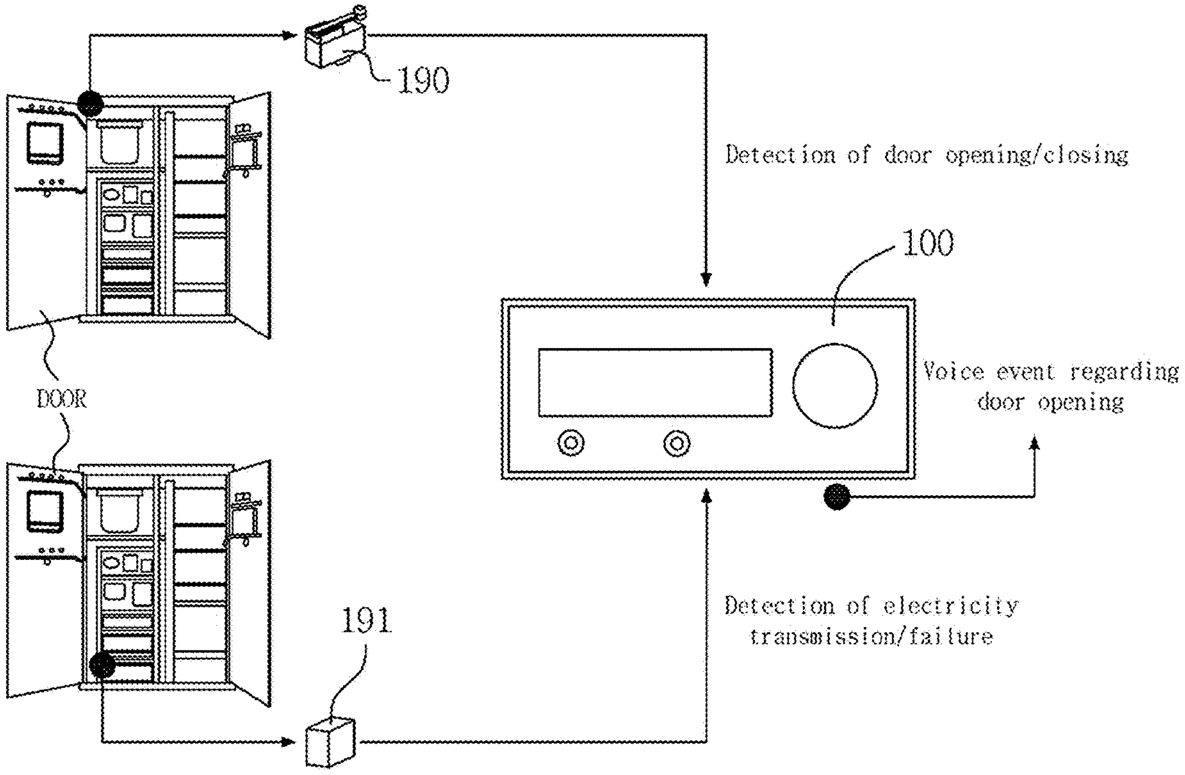
FIG. 8 illustrates an operating embodiment of a panel in which the electrical safety alarm apparatus according to the present invention is used.

FIG. 7 illustrates an embodiment in which a switch and a relay are applied to the electrical safety alarm apparatus according to the present invention, and FIG. 8 illustrates an operating embodiment of a panel in which the electrical safety alarm apparatus according to the present invention is used.

As illustrated in FIG. 7, the embodiment, in which the switch and the relay are applied to the electrical safety alarm apparatus according to the present invention, shows that, for example, the switchgear, power MCC board, distribution board, #plant control board, and the like are applied to the electrical safety alarm apparatus according to the present invention and the DOOR is in an open state, wherein: the door comprises a door detection switch 190 and an electrical detection relay 191; and the door detection switch 190 detects door open/closed, and the electrical detection relay 191 detects power transmission/power failure. When the DOOR is opened as shown in FIGS. 7 and 8, the door open/closed detection and power transmission/power failure are detected in the electrical safety alarm apparatus 100. Then, regarding an event, safety-related voice output (voice event) or text display and the operation of the LED constituting the first and second display units 130 and 131 (a lamp event during power transmission/a lamp event during power failure) is performed through the speaker 110, the display unit 120, and the first and second display units 130 and 131.

Figure 9:
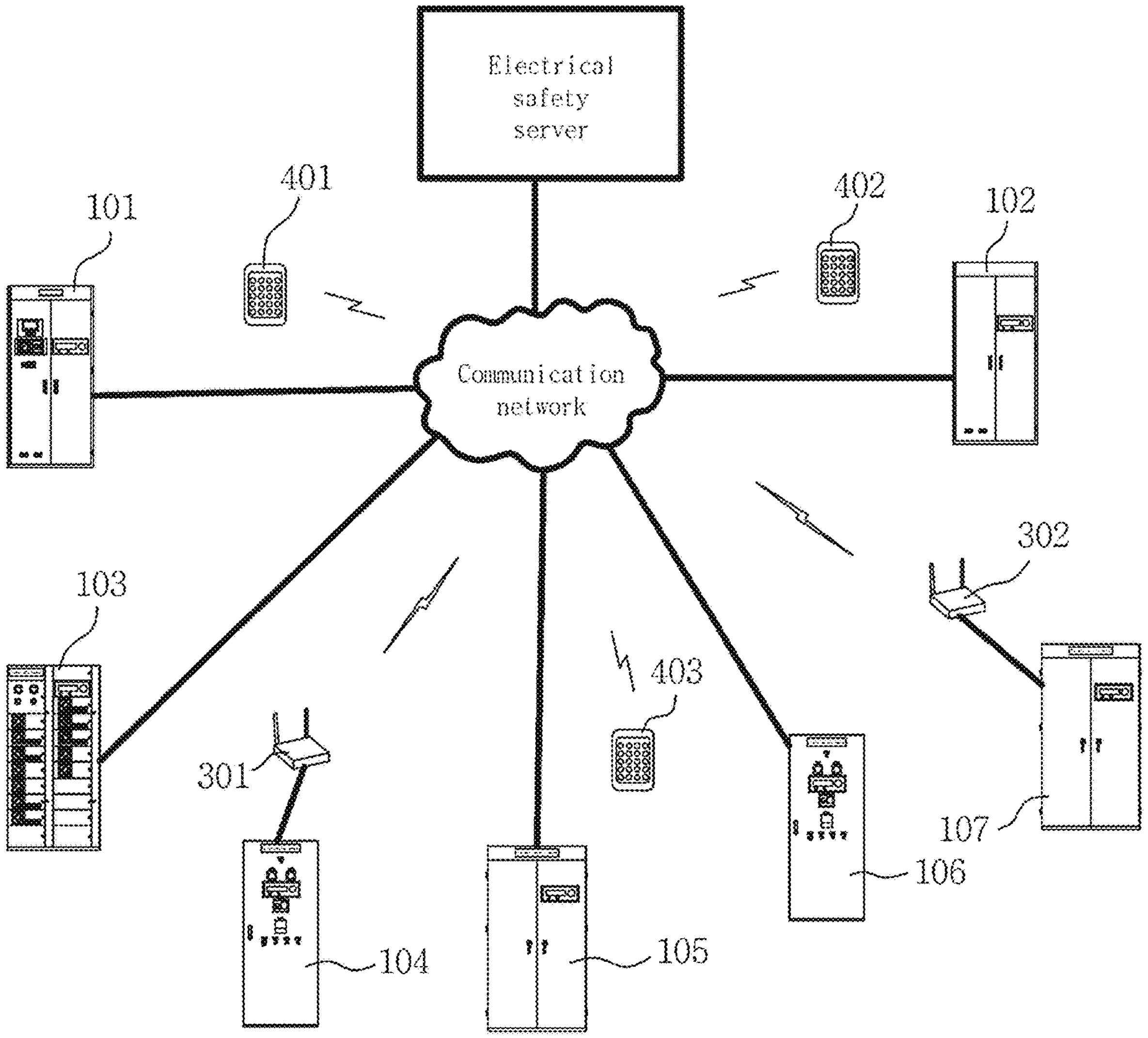
FIG. 9 is a block diagram for explaining an embodiment of an electrical safety alarm system including the electrical safety alarm apparatus according to the present invention.
Figure 10:
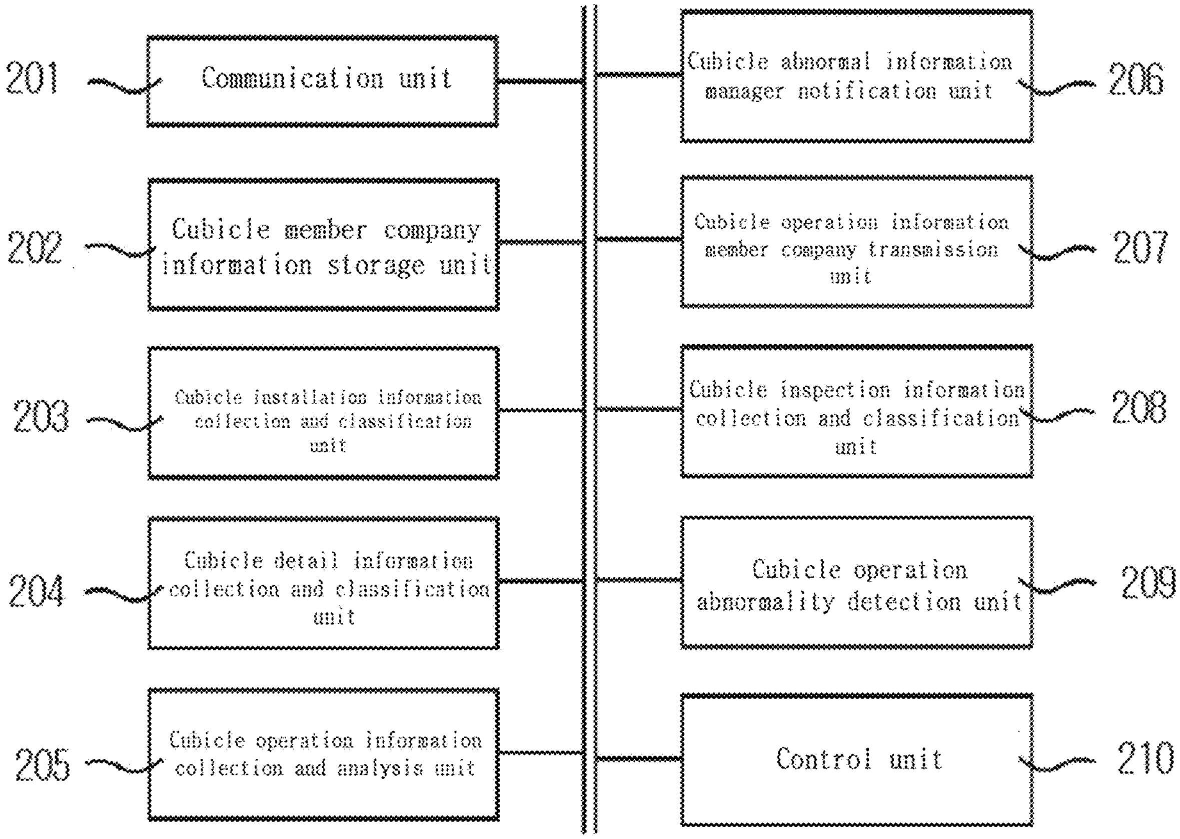
FIG. 10 illustrates an embodiment of an electrical safety alarm server in the electrical safety alarm system illustrated in FIG. 9.

FIG. 9 is a block diagram for explaining an embodiment of an electrical safety alarm system including the electrical safety alarm apparatus according to the present invention, and FIG. 10 illustrates an embodiment of an electrical safety alarm server in the electrical safety alarm system illustrated in FIG. 9.

As illustrated in FIG. 9, the embodiment of the electrical safety alarm system including the electrical safety alarm apparatus according to the present invention comprises a plurality of cubicles 101-107, an electrical safety server 200, a plurality of access points 301 and 302, and a plurality of smart phones 401-403, wherein the plurality of cubicles 101-107 stores the switchboard, power MCC board, distribution board, and #plant control board, wherein each of the switchboard, power MCC board, distribution board, and #plant control board is equipped (installed) with the electrical safety alarm apparatus 100, wherein:

each of the plurality of cubicles 101-107 houses one of the power distribution board, power MCC board, distribution board, and #plant control board; the electrical safety alarm apparatus 100 is installed in the DOOR as illustrated in FIG. 1; and each electrical safety warning apparatus 100 communicates with the electrical safety server 200 through the LAN port of the first communication unit 160. At this time, as described above, the state of the electrical safety alarm apparatus 100 is transmitted to the electrical safety server 200, monitoring is possible in the electrical safety server 200 at a remote location, and the event logs (second, minute, hour, day, month, year) including door opening/closing is transmitted to recorded and stored. That is, wired and wireless networks can be selectively used.

The electrical safety server 200 receives status information of the switchboard, power MCC board, distribution board, and #plant control board, wherein the status information Status information is transmitted from each of the plurality of cubicles 101-107 from the electrical safety alarm apparatus 100 of each of the switchboard, power MCC board, distribution board, and plant control board. The electrical safety server 200 also stores log records for door opening/closing events from the door detection switch 190 and the electrical detection relay 191 connected to the electrical safety alarm apparatus 100.

When the plurality of access points (APs) 301 and 302 are connected to the first communication unit 160 and configured through Wi-Fi communication, the state of the electrical safety alarm apparatus 100 is transmitted to the electrical safety server 200 through Wi-Fi. Accordingly, monitoring (1:N) is possible in the electrical safety server 200 at a remote location, and events (second, minute, hour, day, month, year) including door opening/closing is transmitted.

When a worker, an operator, or electrical safety personnel carrying smart phones access cubicles for inspection and repair of the extra-high and low voltage boards, power MCC board, distribution board, and plant control board, the plurality of smart phones 401-403 are connected to the second communication unit 170 of the electrical safety warning apparatus 100 through a Bluetooth method, receive information, output from the speaker unit 110, display unit 120, and first and second display units 130 and 131 of the electrical safety warning apparatus 100, and display the information on the speakers or display units of the smart phones. Of course, necessary apps may be installed in advance for the purpose. Accordingly, if the information output from the speaker unit 110, the display unit 120, and the first and second display units 130 and 131 of the electrical safety alarm apparatus 100 is transmitted via the Bluetooth method, the worker, operator, or electrical safety personnel can be strongly reminded of caution via the smart phones 400-402 during the inspection and maintenance of the extra-high voltage and low voltage board, power MCC board, distribution board, and plant control board, and the like, even in case where a failure occurs in one or more of the speaker unit 110, the display unit 120, and the first and second display units 130 and 131 of the electrical safety alarm apparatus 100.

FIG. 10 is the block diagram for explaining the embodiment of the electrical safety alarm server in the electrical safety alarm system.

As illustrated in FIG. 10, the embodiment of the electrical safety alarm sever in the electrical safety alarm system according to the present invention comprises a communication unit 201, a cubicle member company information storage unit 202, a cubicle installation information collection and classification unit 203, a cubicle detail information collection and classification unit 204, a cubicle operation information collection and analysis unit 205, a cubicle abnormal information manager notification unit 206, a cubicle operation information member company transmission unit 207, a cubicle inspection information collection and classification unit 208, a cubicle operation abnormality detection unit 209, and a control unit 210, wherein:

- the communication unit 201 communicates with the first communication unit 160 of the electrical safety alarm apparatus 100 of each of the plurality of cubicles 101-107 to collect information on the extra-high and low voltage boards, power MCC board, distribution board, and plant control board from the plurality of cubicles 101-107;
- the cubicle member company information storage unit 202 stores information on manufacturers who have produced and installed the extra-high and low voltage boards, power MCC board, distribution board, and plant control board of each of the plurality of cubicles 101-107;
- the cubicle installation information collection and classification unit 203 collects and classifies installation information on the extra-high and low voltage boards, power MCC board, distribution board, and plant control board of each of the plurality of cubicles 101-107 (i.e., manufacturers of the extra-high and low voltage boards, power MCC board, distribution board, and plant control board, contact information, installation location, installation date, and so on);
- the cubicle detailed information collection and classification unit 204 collects and classifies detailed information on the extra-high and low voltage boards, power MCC board, distribution board, and plant control board of each of the plurality of cubicles 101-107 (i.e., detailed capacity of the extra-high and low voltage boards, power MCC board, distribution board, and plant control board, and so on); and
- the cubicle operation information collection and analysis unit 205 analyzes operation information on the extra-high and low voltage boards, power MCC board, distribution board, and plant control board of each of the plurality of cubicles 101-107 collected through the communication unit 201, thereby allowing for analyzing the occurrence of abnormalities during operation of the extra-high and low voltage boards, power MCC board, distribution board, and plant control board of each of the plurality of cubicles 101-107;
- the cubicle abnormal information manager notification unit 206 notifies a manager (a worker, an operator, electrical safety personnel) through smart phones when abnormal information is generated according to the analysis result of the cubicle operation information collection and analysis unit 205, and, to this end, the cubicle abnormal information manager notification unit 206 stores information on the manager (worker, operator, electrical safety personnel) of each extra-high and low voltage boards, power MCC board, distribution board, and plant control board and information on their smart phones;
- the cubicle operation information member company transmission unit 207 transmits the abnormality information of a member company's equipment to the member company that manufactured the extra-high and low voltage boards, power MCC board, distribution board, or plant control board in which abnormal information has occurred according to the analysis result of the cubicle operation information collection and analysis unit 205, wherein the member company is stored in the cubicle member company information storage unit 202, whereby the member company (manufacturer) can use the information as a reference when developing its equipment;
- the cubicle inspection information collection and classification unit 208 collects and classifies inspection information collected by the worker, operator, and electrical safety personnel such as the daily, monthly, quarterly, and yearly inspections of the cubicles when the inspection information is transmitted through a smart phone, a work PC, a smart pad, and the like, of the worker, operator, and electrical safety personnel;
- the cubicle operation abnormality detection unit 209 detects an operational abnormality of the cubicle from the information collected and classified by the cubicle inspection information collection and classification unit 208, wherein the abnormal information detected in this manner is also transmitted to the cubicle operation information member company transmission unit 207, and is used to examine abnormality of cubicle operation; and
- the controller 210 controls the communication unit 201, the cubicle member company information storage unit 202, the cubicle installation information collection and classification unit 203, the cubicle detailed information collection and classification unit 204, and the cubicle operation information collection and analysis unit 205, the cubicle abnormality information manager notification unit 206, the cubicle operation information member transmission unit 207, the cubicle inspection information collection and classification unit 208, and the cubicle operation abnormality detection unit 209.

While the present invention has been described in accordance with the foregoing embodiments, it is not necessarily limited thereto. It will be apparent to a person skilled in the art that various modifications can be made to the described embodiments of the present invention without departing from the spirit of the invention. Thus, the embodiments disclosed in the present invention are not intended to limit the technical idea of the present invention, but should be considered in a descriptive sense only, and the scope of the technical idea of the present invention is not limited by the embodiments. The scope of protection of the present invention should be construed according to the claims below, and all technical ideas within the scope of equivalents should be construed as being included in the scope of rights of the present invention.

EXPLANATION OF REFERENCE SIGNS

100: Electrical safety alarm apparatus 101-107: Cubicle
110: Speaker unit
120: Display unit 130, 131: Display unit
140: DI INPUT port 141: DO OUTPUT port
150: AC 220 input port 151: DC 125 input port
160: First communication unit 170: Second communication unit
180: Control unit 190: Door detection switch
191: Electric detection relay 200: Electric safety server
301, 302: AP (Access Point) 401-403: Smart phone

The invention claimed is:

1. An electrical safety alarm system, comprising an electrical safety server (200) and a plurality of cubicles (101-107), configured as one or more of a switchgear cubicle, an extra-high voltage board cubicle, a low voltage board cubicle, a power MCC board cubicle, a distribution board cubicle, and a plant control board panel cubicle, each cubicle equipped with an electrical safety warning apparatus (100), the electrical safety alarm apparatus (100) comprising:

a speaker unit (110) configured to output a voice message to remind one or more electrical safety personnel of events using one or more safety phrases before opening a door of a cubicle;

a display unit (120) configured to display the voice message for the events using the one or more safety phrases in text form to remind the one or more electrical safety personnel before opening the door of the cubicle;

a first display unit (130) configured to display an electricity transmission state of the electrical safety alarm apparatus (100);

a second display unit (131) configured to display a power failure state of the electrical safety alarm apparatus (100);

a DI INPUT port (140) configured as a 4 channel digital input port;

a DO OUTPUT port (141) configured as a 4 channel digital output port;

an AC 220 input port (150) configured as a power port;

a DC 125 input port (151) configured as a high-voltage transmission detection port;

a first communication unit (160) comprising a LAN port and configured to transmit the electricity transmission state of the electrical safety alarm apparatus (100) to the electrical safety server (200) via a communication network;

a second communication unit (170) using Bluetooth protocol and configured to transmit the current state of the cubicle when the second communication unit (170) is connected to a smart phone of an operator or the one or more electrical safety personnel;

a door detection switch (190) configured to detect the opening/closing of a door of the cubicle;

an electrical detection relay (191), that detects electricity transmission/failure of the cubicle; and a controller (180) configured to control the speaker unit (110), the display unit (120), the first and second display units (130 and 131), the DI INPUT port (140), the DO OUTPUT port (141), the AC 220 input port (150), the DC 125 input port (151), and the first communication unit (160), and comprising a memory in which text and voice messages are stored, and where information for Bluetooth connection with the smart phone of the operator or one or more electrical safety personnel is stored, wherein the electrical safety server (200) comprises a communication unit (201), a cubicle member company information storage unit (202), a cubicle installation information collection and classification unit (203), a cubicle detailed information collection and classification unit (204), a cubicle operation information collection and analysis unit (205), a cubicle abnormal information manager notification unit (206), a cubicle inspection information collection and classification unit (208), a cubicle operation abnormality detection unit (209), and a server controller (210), wherein:

the communication unit (201) communicates with the first communication unit (160) of the electrical safety alarm apparatus (100) of each of the plurality of cubicles (101-107) to collect information from each of the plurality of cubicles;

the cubicle member company information storage unit (202) stores information on manufacturers who have produced and installed each of the plurality of cubicles (101-107);

the cubicle installation information collection and classification unit (203) collects and classifies installation information on each of the plurality of cubicles (101-107), comprising manufacturer information, contact information, installation location, and installation date, and so on;

the cubicle detailed information collection and classification unit (204) collects and classifies the detailed capacities of each of the plurality of cubicles (101-107);

the cubicle operation information collection and analysis unit (205) analyzes the occurrence of abnormalities during operation of each of the plurality of cubicles (101-107) collected through the communication unit (201);

the cubicle abnormal information manager notification unit (206) notifies the smart phones of a worker, the operator, and the one or more electrical safety personnel when abnormal information is generated according to the analysis result of the cubicle operation information collection and analysis unit (205);

the cubicle inspection information collection and classification unit (208) collects and classifies inspection information when inspection information is transmitted through the smart phone, a work PC, or a smart pad of the worker, operator, and one or more electrical safety personnel;

the cubicle operation abnormality detection unit (209) detects an operational abnormality of a cubicle from information collected and classified by the cubicle inspection information collection and classification unit (208); and the server controller (210) controls the communication unit (201), the cubicle member company information storage unit (202), the cubicle installation information collection and classification unit (203), the cubicle detailed information collection and classification unit (204), and the cubicle operation information collection and analysis unit (205), the cubicle abnormality information manager notification unit (206), the cubicle inspection information collection and classification unit (208), and the cubicle operation abnormality detection unit (209), and wherein, when the worker, operator, or one or more electrical safety personnel carrying a plurality of smart phones, access one or more cubicles for inspection and repair, the plurality of smart phones (401-403) are connected to the second communication unit (170) using a Bluetooth protocol, and received information, which is output from the speaker unit (110), display unit (120), and first and second display units (130 and 131), such that the worker, operator, or one or more electrical safety personnel can be strongly reminded to exercise caution via the plurality of smart phones even in case where a failure occurs in the speaker unit (110), the display unit (120), and the first and second display units (130 and 131).

2. The electrical safety alarm system of claim 1, wherein the controller (180) of the electrical safety warning apparatus (100) controls the speaker unit (110) to output the voice message according to results detected by the door detection switch (190) and the electrical detection relay (191), controls the display unit (120) to display the voice message in text form, to display the electricity transmission state, and power failure state of the electrical safety alarm apparatus (100) through the first and second display units (130 and 131) respectively, and to transmit the electricity transmission state, and power failure state information of the electrical safety alarm apparatus (100) to the electrical safety server (200) through the first communication unit (160).

* * * * *